United States Patent Office 3,682,605
Patented Aug. 8, 1972

3,682,605
METHOD AND APPARATUS FOR SOOT CONTROLLING IN A THERMAL DECOMPOSITION OF A HYDROCARBON GAS
Shozo Wada, Yokohama, Japan, assignor to Tokyo Heat Treating Company, Yokohama, Japan
Filed July 14, 1970, Ser. No. 54,793
Claims priority, application Japan, July 15, 1969, 44/55,953; June 15, 1970, 45/51,807
Int. Cl. C01b 2/14; C10g 11/10
U.S. Cl. 48—107                                10 Claims

ABSTRACT OF THE DISCLOSURE

Formation of soot when a hydrocarbon gas is thermally decomposed with air by partial oxidation in an endothermic gas generator filled with an oxidation catalyst layer, can be controlled by introducing a feed gas mixture of the hydrocarbon gas and air rapidly and adiabatically, without any stagnation of gas flow, into a catalyst-filled retort maintained at a retort temperature of 1,000° to 1,100° C. by heating from outside through a perforated heat-insulating block having a thickness enough to attain a heat insulation and thermally decomposing the hydrocarbon gas in the catalyst layer, while supplying heat to the catalyst layer from the outside heating source. The heat-insulating block comprises a heat-insulating brick and a refractory brick and is placed directly upon the catalyst layer without any clearance therebetween. By providing the heat-insulating block in the generator, operation of the generator can be carried out stably for a prolonged period of time with a constant generated gas composition.

---

This invention relates to a method and an apparatus for controlling soots produced by thermal decomposition of a hydrocarbon gas through a high temperature oxidation reaction. More particularly, the present invention relates to a method and an apparatus for controlling soots generated at a high temperature, catalytic partial oxidation of a hydrocarbon gas in an endothermic gas generator.

Carbon troubles in combustion or partial oxidation of a hydrocarbon are brought about in the following forms, that is, formation of soots in a catalyst layer in the manufacture of town gas and reducing protective atmosphere gas (endothermic type gas), build-up of heavy carbides on a burner nozzle, formation of carbon flour inside a diesel engine, etc. As the thermal decomposition of higher hydrocarbons proceeds very rapidly, a solution of said troubles has been heretofore regarded as a very difficult one, and said troubles have not been solved yet.

An object of the present invention is to solve said troubles.

Other object of the present invention is to control soots produced by thermal decomposition at combustion or partial oxidation of a hydrocarbon gas.

That is, the present invention is to provide a method for controlling formation of soots when a hydrocarbon gas is thermally decomposed with air by partial oxidation in an endothermic gas generator filled with an oxidation catalyst layer, which comprises introducing a feed gas mixture of hydrocarbon gas and air rapidly and adiabatically into a catalyst layer without any stagnation of gas flow through a plurality of gas passages of a heat-insulting means having a thickness enough to attain heat insulation and thermally decomposing the hydrocarbon gas in the catalyst layer while supplying the necessary heat to the catalyst layer from an outside heating source and a heat-insulating block for controlling formation of soots when a hydrocarbon gas is thermally decomposed with air by partial oxidation in an endothermic gas generator filled with an oxidation catalyst layer, which comprises a heat-insulating brick as an upper member and a refractory brick as a lower member, a plurality of gas vertical passage perforations being provided through the block communicating from the upper end to the bottom end, said two members being tightly secured by bolts, an annular groove being provided around the side of the block for inserting an insulating packing, a layer vertical perforation being provided at the center of block communicating from the bottom end to the upper end, the block being placed upon the catalyst layer in the retort and the upper surface of the catalyst layer being in close contact with the bottom end of the block without any clearance therebetween.

It has been heretofore well known in the case of combustion or partial oxidation of a hydrocarbon gas that the generation of soots can be prevented or reduced by using an air mixing ratio of at least 60% in excess of the amount of air necessary for complete combustion of the hydrocarbon gas or using steam in place of the air. However, in the protective atmosphere heat treatment of metals, for example, low or high alloy steel, there occur the following problems. That is, in such protective atmosphere heat treatment, a large amount of a protective atmosphere gas having a high reducing ability and a constant gas composition is required to supply. In the manufacture of such protective atmosphere gas, partial oxidation must be carried out with about 30% of the amount of air required for the complete combustion of the hydrocarbon gas. Thus, soots are liable to be formed by thermal decomposition of the hydrocarbon gas within the reactor retort of the gas generator, filled with an oxidation catalyst layer, where the oxidation is to be carried out. When the catalyst layer is contaminated with the soots, cloggings are brought about among the catalyst, and as a result a composition of the generated gas is fluctuated within a relatively short period of time, for example, 7 to 15 days and finally the required amount of the gas cannot be obtained.

These problems are also prevailing in the production of town gas from higher hydrocarbon by conversion. In the production of the town gas, it is important, in view of its utilization purpose, to obtain town gas having the required calories. So long as this calorie purpose can be satisfied, the fluctuation in the town gas composition is not objectionable. That is to say, the town gas composition itself has a broad allowable range. In the manufacture of the town gas, it is economically possible to use a large scale production facility. In other words, prevention of the catalysts from cloggings by the soots within the reactor retort of the gas generator and prevention of the catalysts from breakages as well as elongation of operating period of the production facility are problems specific to the town gas manufacture. Thus, steam conversion is now widely used in the town gas production.

In the field of partial oxidation of a hydrocarbon gas, particularly in the field of production of an endothermic type gas for the protective atmosphere heat treatment, where a strict control of a composition of generated gas is indispensable without any slight fluctuation for over a long period of time and a large production scale facility is regarded as un-economical, prevention of soots generated by thermal decomposition of a hydrocarbon gas is the most important problem in such field.

Various attempts have been heretofore carried out to control soots generated by thermal decomposition of a hydrocarbon gas through a partial oxidation reaction, that is, to stabilize the generated gas and prevent the cloggings in the catalyst layer. However, the process for decomposing the hydrocarbon gas to fine carbon particles, that is, soots, has been sufficiently clarified, and a satisfactory and fundamental measure for controlling the generation of soots by thermal decomposition has not yet been established. That is, there has been no example of keeping the composition of generated gas to a negligible change for over a period of a few months. In the endothermic gas generator, where the parital oxidation of a hydrocarbon gas is carried out under the most strict conditions, the soots generated by the thermal decomposition as usually removed by periodically blowing air into the reactor retort in short intervals and burning out the generated soots with the air. In detail, operation of the generator is continued until the composition of the gas produced in the partial oxidation has reached a limit value, which is allowable in view of the quality required for such heat treatments as gas carburizing, non-oxidative, non-decarbonizing hardening, etc., and if the composition exceeds said limit value, the operation is discontinued and the soots deposited and accumulated inside the reactor retort are removed by blowing air into the reactor retort to burn out the soots. After the soots have been removed, the catalytic activity of the oxidation catalysts is regained, and operation is continued until the catalysts have been covered again by the soots. Even in practically most assured operation, the continuous operating period of the generator now used in the relevant fields is very short regardless of the types of the generators.

Even in the field of the atmosphere heat treatment, where automation has now been so widely employed in the production facilities that mass-production has been carried out in the heat treatment of iron and steel, similar situation is now prevailing. That is, no measure has been established yet for the atmosphere control, particularly control of the soots generated by the thermal decomposition, in spite of such facts that the temperature control and automation of transfer of products are effectively carried out. In other words, it can be said that the basis for the automation is not yet sufficiently established.

According to the present invention, a serious influence of soots generated in the reactor retort of an endothermic gas generator can be effectively eliminated and a reducing gas having a strictly controlled composition can be continuously obtained for a prolonged period of time.

Endothermic gas conversion reaction, which seems to be the most heavily and seriously influenced by the soots generated by the thermal decomposition, proceeds at a high retort temperature, for example, 1,000 to 1,100° C. in the following manner:

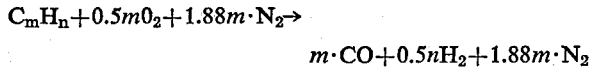

The present inventor has made careful studies of this conversion reaction and as a result has found the following new facts.

(1) The soots generated in the reactor retort filled with an oxidation catalyst layer in the enothermic gas generator are classified into two groups. That is, the one is the thermal decomposition soots resulting from higher hydrocarbon gas in the exothermic reaction zone, and the other is the thermal decomposition soots resulting from lower hydrocarbon gas (whose main component is $CH_4$) in the endothermic reaction zone.

(2) The most of the soots generated in the reactor retort results from the decomposition of hydrocarbon gas in the exothermic reaction zone.

(3) If sufficient heat is supplied to the endothermic reaction zone, the soots generated by the thermal decomposition reaction in the exothermic reaction zone are mainly deposited on the oxidation catalyst layer. The amount of deposited or accumulated soots is increased with time. Thus, the change in the composition of the gas converted in the endothermic gas generator is correspondingly increased.

(4) The rate of thermal decomposition reaction of higher hydrocarbon gas is very high. For example, it is known, in the case of butane, from the well known relation formula between the reaction rate constant and the reaction temperature, $K = ae^{-E/RT}$, wherein K represents a reaction rate constant; R a gas constant; T an absolute temperature; E a reaction characteristic constant (activation energy); $a$ a constant, that butane is entirely decomposed to lower hydrocarbons and hydrogen at 900° C. for about $\frac{1}{1,000}$ second. However, detail of the process for generating soots from these lower hydrocarbons has not been completely clarified yet. The present inventor has found that the thermal decomposition reaction for generating these soots takes more prolonged time than said decomposition to the lower hydrocarbon gas, and further that formation of thermal decomposition soots can be almost completely controlled by supplying a gas mixture of higher hydrocarbon gas and air adiabatically to the zone where sufficient oxidation reaction can be carried out.

(5) In the endothermic gas generator, the hydrocarbon gas which has reached the oxidation catalysts can undergo sufficient oxidation reaction by a catalytic action with oxygen in the air of the gas mixture. That is, as the reaction, $2C + O_2 \rightarrow 2CO$, proceeds at a temperature of about 704° C., the fine carbon particles just after the termal decomposition are readily gasified with oxygen by help of the oxidation catalysts, if the retort temperature is sufficiently high, for example, 1,000° to 1,100° C., where the upper limit of the temperature is the refractoriness of a refractory material constituting the reactor retort.

(6) The thermal decomposition soots in the exothermic reaction zone can be controlled by the foregoing procedure. If sufficient heat is supplied to the thermal decomposition in the endothermic reaction zone of the most stable $CH_4$ among the hydrocarbon gases, the oxidation reaction of $CH_4$ can smoothly proceed without liberation of soots by thermal decomposition, by means of $H_2O$ and $CO_2$ produced in the exothermic reaction zone.

As the result of the studies of the foregoing facts, it has been found that the prevention of soots from the formation by thermal decomposition by hydrocarbon gas in the reactor retort can be effected only by satisfying at least the following three conditions.

(1) A gas mixture of the air and hydrocarbon gas to be introduced into the reactor retort must reach the temperature at which the refractory material is not damaged in the exothermic reaction zone, that is, 1,000°–1,100° C., from 500°–600° C. for about $\frac{1}{300}$ second or less.

(2) The gas mixture, which has been rapidly elevated to the high temperature, must be allowed to come in contact with the effective oxidation catalysts immediately without any stagnation of gas flow.

(3) A flow velocity of the gas, which passes through the reactor retort, must be high enough to remove the soots from the catalyst surface immediately, even if a very small amount of soots is generated and deposited on the catalyst surface. To set a high flow velocity of the gas which passes through the reactor retort and promote the oxidation reaction smoothly, the temperature distribution throughout the reactor retort cross-section must be uniform and at a high temperature level.

In the present invention, the conventional type generator having a high space velocity and a better temperature distribution througout the reactor retort cross-section is used, but to incorporate said conditions for the thermal decomposition and oxidation reactions into the conventional generator, a novel mechanism for introducing the gas mixture into the reactor retort, that is, a novel heat-insulating block, is placed in a gas mixture inlet zone just upon the upper surface of a catalyst layer filled in the reactor retort. The heat-insulating block consists of a heat-insulating brick as an upper member and a refractory brick as a lower member, a plurality of vertical gas passage perforations being provided through the block from the upper end to the bottom end. The heat-insulating block is placed upon the upper surface of the catalyst layer so that there is no gas-stagnant zone between the bottom end of the block and the upper surface of the catalyst layer. The generation of the soots by the thermal decomposition of the hydrocarbon gas can be controlled by providing the present heat-insulating block in the reactor retort.

Now, the present invention will be explained in detail, referring to the accompanying drawings.

Figure 1:
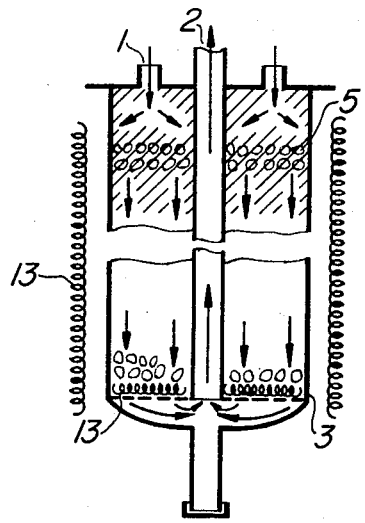
FIGS. 1 and 2 are cross-sectional views showing the inside arrangement of reactor retort of the conventional, endothermic gas generators.
Figure 2:
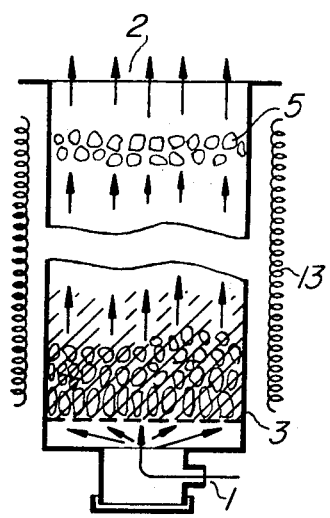

In FIGS. 1 and 2, the reactor retorts of two typical endothermic gas generators now widely used are shown. The gas mixture of hydrocarbon gas and air is fed to a reactor retort 3 from an inlet 1, passed through a catalyst layer 5 and withdrawn from an outlet 2. The reactor retort 3 is heated by an electric heating source 13. The hatching section of the reactor retort shows a considerable soot build-up. In the reactor retort shown in FIG. 1, the maximum number of exchanges of the gas mixture volume per the volume of the reactor retort in a catalyst-unfilled state per unit time is about 1,000 per hour, and the double-pass mechanism as shown in FIG. 1 is effective for maintaining a good temperature distribution within the reactor retort. In the reactor retort as shown in FIG. 2, the maximum number of exchange of the gas mixture volume per the volume of the reactor retort in a catalyst-unfilled state per unit time is about 500 per hour.

Figure 5:
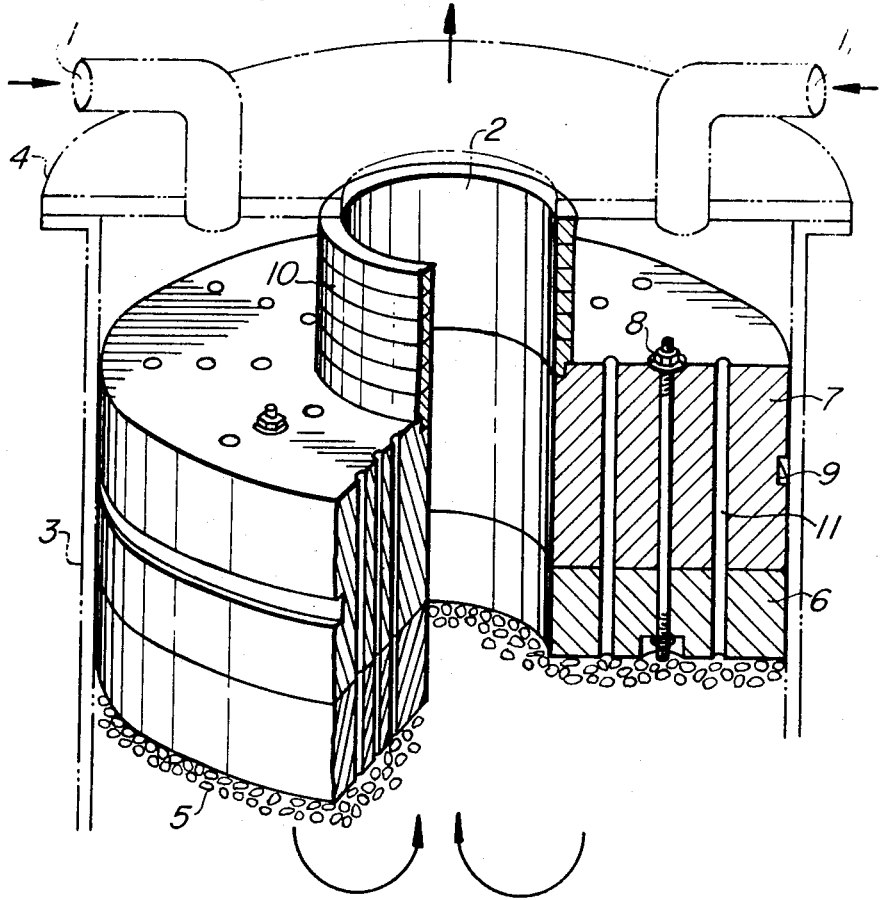
FIG. 5 is a partially cut-away view of the present heat-insulating block.
Figure 4:
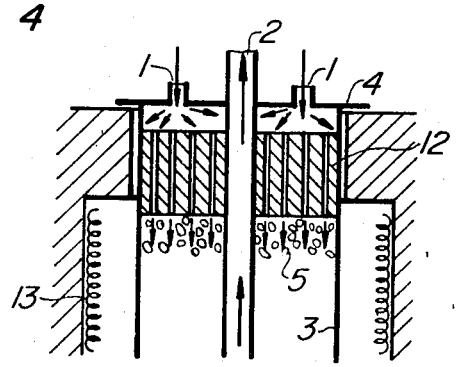
FIG. 4 is a vertical cross-sectional view showing the present heat-insulating block applied to the conventional generator.

In FIGS. 4 and 5, the gas mixture-introducing mechanism of the present invention, that is, the heat-insulating block, placed in the reactor retort of the conventional, double-pass, endothermic gas generator of FIG. 1 is shown. That is, a heat-insulating block 12 is placed at a gas mixture-introducing zone upon the upper surface of a catalyst layer 5 filled in a reactor retort 3. The heat-insulating block 12 consists of a heat-insulating brick 7 as an upper member and a refractory brick 6 as a lower member, a plurality of vertical gas passage perforations 11 being provided through the heat-insulating block 12 from the upper end to the bottom end. The heat-insulating block 12 is placed in close contact with the upper surface of the catalyst layer 5 so that there may not be a gas stagnant zone between the bottom end of the heat-insulating block 12 and the upper of the catalyst layer 5. The heat-insulating brick 7 and the refractory brick 6 of the heat-insulating block 12 are tightly secured together by means of a plurality of bolts 8. An annular groove 9 is provided around the side surface of the heat-insulating block 12, and a heat-resistant packing (not shown in the drawing) is inserted in said groove to prevent a leakage of the generated gas through a clearance between the reactor retort 3 and the heat-insulating block 12. Furthermore, a cylindrical heat-resistant packing 10 is provided at the generated gas outlet pipe to protect thermal decomposition of feed hydrocarbon gas by contacting at the high temperature outlet pipe surface.

A gas mixture of feed hydrocarbon gas and air is introduced into the reactor retort 3 through the feed gas inlet 1. The thus introduced gas passes through the vertical gas passage perforations 11 of the heat-insulating block 12 and enters into a reaction chamber heated from outside to a retort temperature of 1,000° to 1,100° C., where the feed gas mixture comes in contact with the catalysts and undergoes partial oxidation reaction. The generated gas leaves the reaction chamber from the bottom of reaction chamber and is withdrawn from the outlet 2. Gas velocity through the catalyst layer of the reaction chamber is about 3 to 10 m./second, and gas velocity through the perforations of the heat-insulating block is 6 to 17 m./second. Said three conditions for preventing the generation of the soots can be satisfied by placing the heat-insulating block in the generator.

Now, the present invention will be explained hereunder, referring to example.

EXAMPLE

An endothermic gas generator as shown in FIG. 1, which was regarded most seriously influenced by soots, was used to effect high temperature partial oxidation of hydrocarbon gas, where butane gas was used as a feed gas. The reactor retort was electrically heated. A heat-insulating block of the present invention having a structure as shown in FIG. 5 was fixed to the generator, as shown in FIG. 5, and the butane was thermally decomposed by introducing it through the perforations of the heat-insulating block into the reaction chamber.

The heat-insulating block used in example consisted of an alumina refractory brick at the high temperature catalyst side and a heat-insulating brick at the opposite side. Two kinds of the heat-insulating blocks having different overall thickness of 190 mm. and 260 mm. were used in example, but in either case no build-up of soots on the inside surfaces of the perforations provided in the heat-insulating block was observed at all. Furthermore, no build-up of the soots was observed even in the neighbours at the inlet of the reactor retort, either.

Gas passage perforations were provided at equal distances in the heat-insulating block so that no stagnation of the feed gas flow might take place at all when the feed gas reached the catalyst layer through the gas passage perforations, and the open ends of the gas passage perforations at the catalyst side were expanded in a smoothly curved form so that no stagnation of the feed gas flow might take place between the perforations. When the open ends at the catalyst side were not expanded, there took place a stagnation of gas flow between the perforations and heavy carbides were deposited therebetween.

The heat-insulating block was placed upon the upper surface of the catalyst layer so that the bottom of the block might be always in close contact with the upper surface of the catalyst layer while the reaction was carried out. When no close contact could be maintained between the bottom of the block and the upper surfaces of the catalyst layer, for example, when there was a space of more than 30 mm. therebetween, soots were rapidly formed and built up. As a result, operation of the generator had to be discontinued within a very short period of time.

Figure 6:
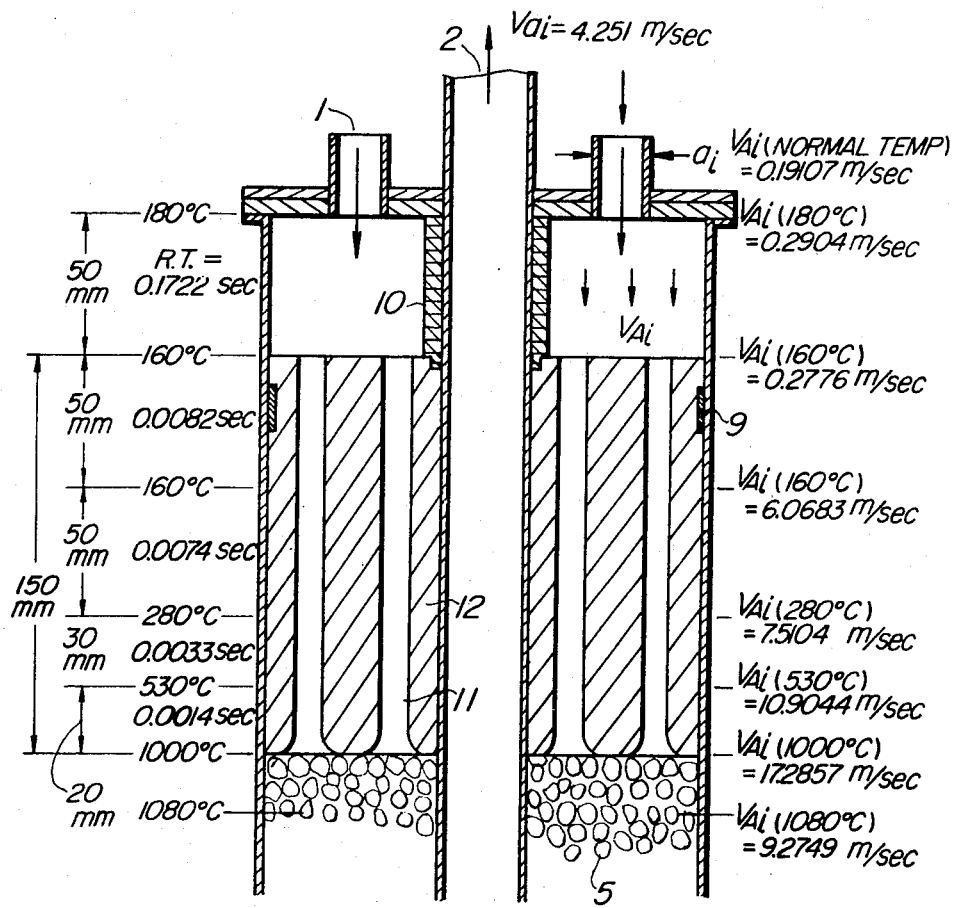
FIG. 6 is a view of the present heat-insulating block showing the gas temperature and gas flow velocity when butane is passed through the generator as the feed gas.

A remarkable effect of controlling the thermal decomposition soots was observed when the gas flow velocity through the gas passage perforations provided in the heat-insulating block was from the value shown in FIG. 6 as a maximum to one-fourth of said maximum value. In FIG. 6, an analytical diagram showing the flow velocity, temperature and residence time of the gas passing through the heat-insulating block is given, where the flow velocity and the residence time are calculated as those for an ideal gas. In FIG. 6, $V_{ai}$ is a gas velocity (m./sec.) at the inlet of the reactor retort on the basis of the inlet tube diameter, $ai$, and $V_{Ai}$ shows gas velocities (m./sec.) at the respective leevls on the basis of the reactor retort diameter, and R.T. shows gas retention time (sec.) at the respective zones.

Figure 7:
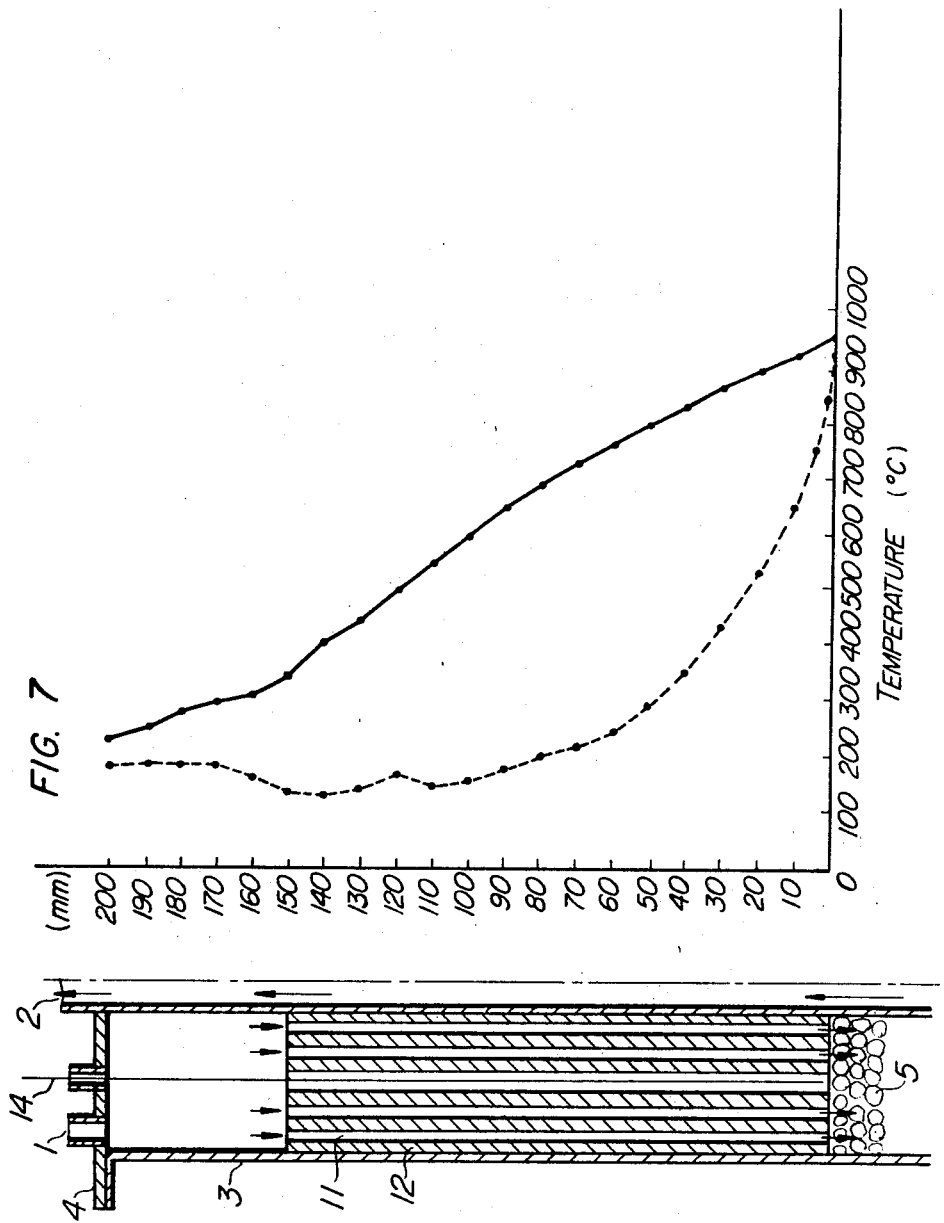
FIG. 7 is a diagram showing a temperature distribution when the gas is passed through the vertical perforations in the present heat-insulating block.
Figure 8:
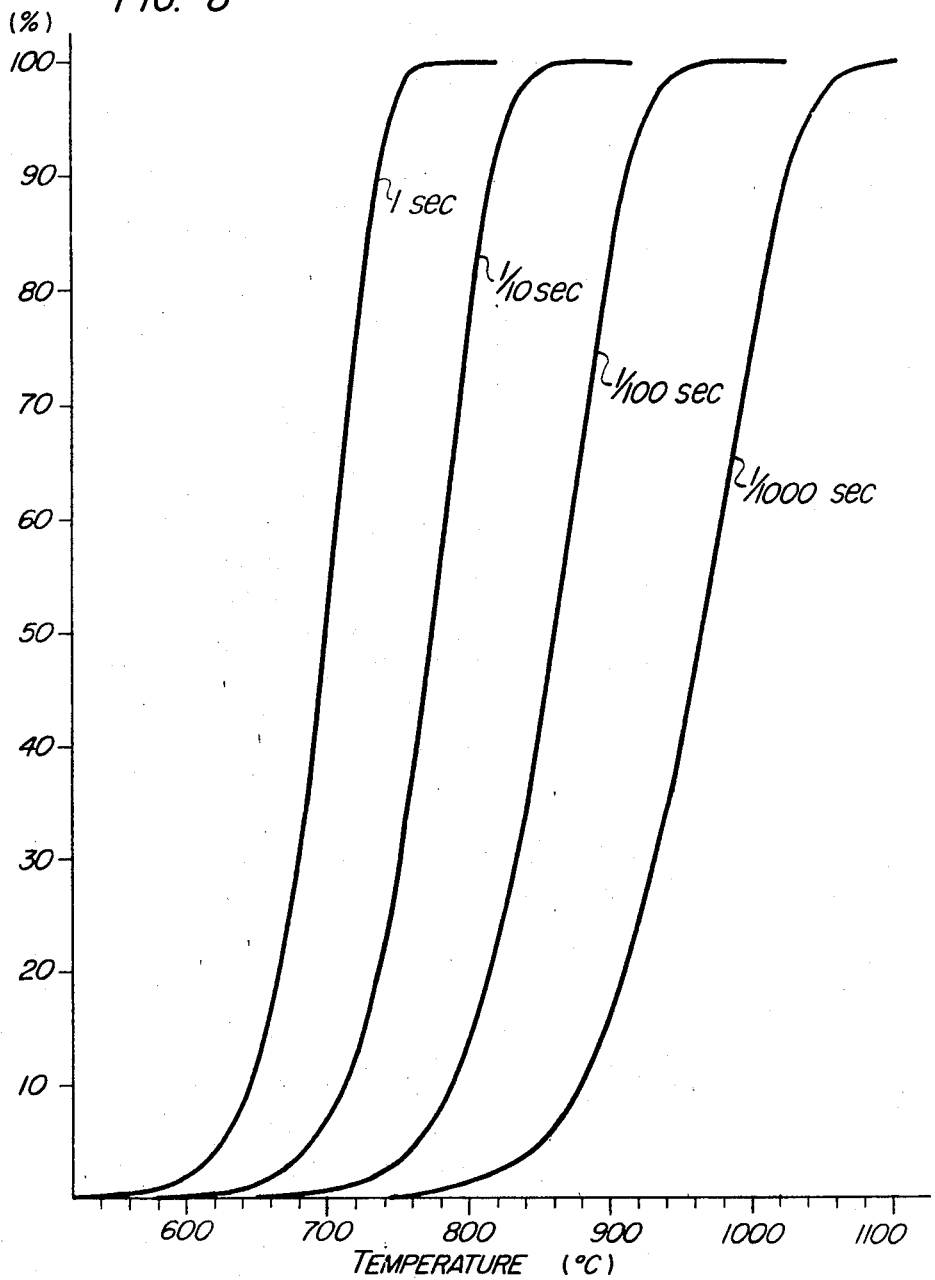
FIGS. 8 and 9 show diagrams showing thermal decomposition percentages of propane and butane, respectively.
Figure 9:
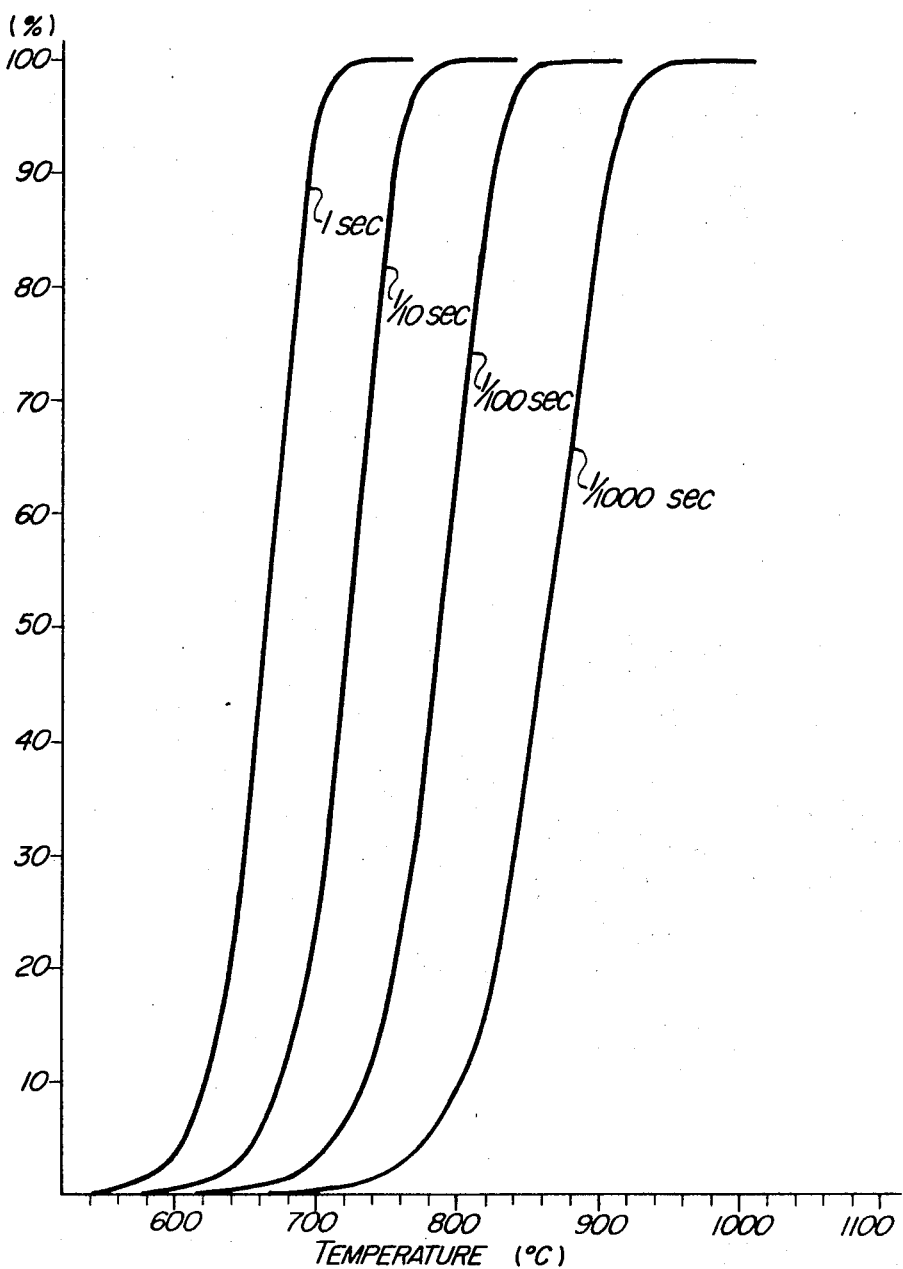

In view of the temperature distribution diagram of FIG. 7, it can be seen that the rate of thermal decomposition of higher hydrocarbon gas to generated gas is considerably lower than the rates of thermal decomposition of lower hydrocarbon gas to generated gas as shown in FIGS. 8 and 9, when a fluid resistance at the inside walls of the vertical gas passage perforations of the heat-insulating block, and further the formation of thermal decomposition soots can be controlled by placing a relatively simple heat-insulating block of the present invention in the reactor retort. In FIG. 7, a temperature distribution of the gas passing through the perforations provided in the heat-insulating block is shown, where the ordinate shows the height (mm.) of the heat-insulating block; the abscissa shows the temperature in the perforations; the dotted line shows the case where the gas was passed through the block and the full line shows the case where no gas was passed through the block. Numeral 14 in FIG. 7 represents a thermocouple.

In FIG. 8, a relation between the thermal decomposition temperature of propane (° C.: abscissa) and the thermal decomposition percentage (percent: ordinate) is shown. That is, the thermal decomposition percentage of propane to lower hydrocarbons at the respective thermal decomposition temperatures is shown at the reaction time of 1 sec., 1/10 sec., 1/100 sec. and 1/1,000 sec. as parameters.

In FIG. 9, the thermal decomposition percentage of n-butane to lower hydrocarbons at the respective thermal decomposition temperatures is likewise given at the reaction time of 1 sec., 1/10 sec., 1/100 sec. and 1/1,000 sec. as a parameter.

The endothermic gas generator conditions and the conversion conditions employed in example are given below:

(1) Generator and principal thermal decomposition conditions (a) Thermal decomposition temperature: 1,080° C. (at a position 10 mm. distant from the outer wall of the reactor retort).

(b) Material of reactor retort: Inconel; heat-resistant alloy.

(c) Catalyst used: 3/4" spherical catalyst NiO 914, a trademark of the catalyst made by Harshaw Chemical Company, U.S.A.

| Composition: | Percent |
|---|---|
| NiO | 7.5 |
| $Al_2O_3$ | 79.0 |
| $SiO_2$ | 11.2 |
| Total of trace components | 2.3 |

Surface area, 5 m.²/g. or less.

(d) Feed gas: butane gas.

| Composition: | | |
|---|---|---|
| Propane | percent | 0.4 |
| n-Butane | do | 78.8 |
| i-Butane | do | 20.8 |
| Sulfur content | wt. percent | 0.002 |

(e) Number of gas volume exchanges per the volume of the reactor retort per unit time when the retort was empty: 1,000–1,200/hr.; gas velocity through the catalyst layer: about 10 m./sec.

(f) Generated gas dew point: 0° to −5° C.

(g) Temperature distribution through the catalyst layer cross-section: Temperature difference between the center of the catalyst layer in the endothermic reaction zone and the outer wall of the reactor retort was about 100° C.

Figure 10:
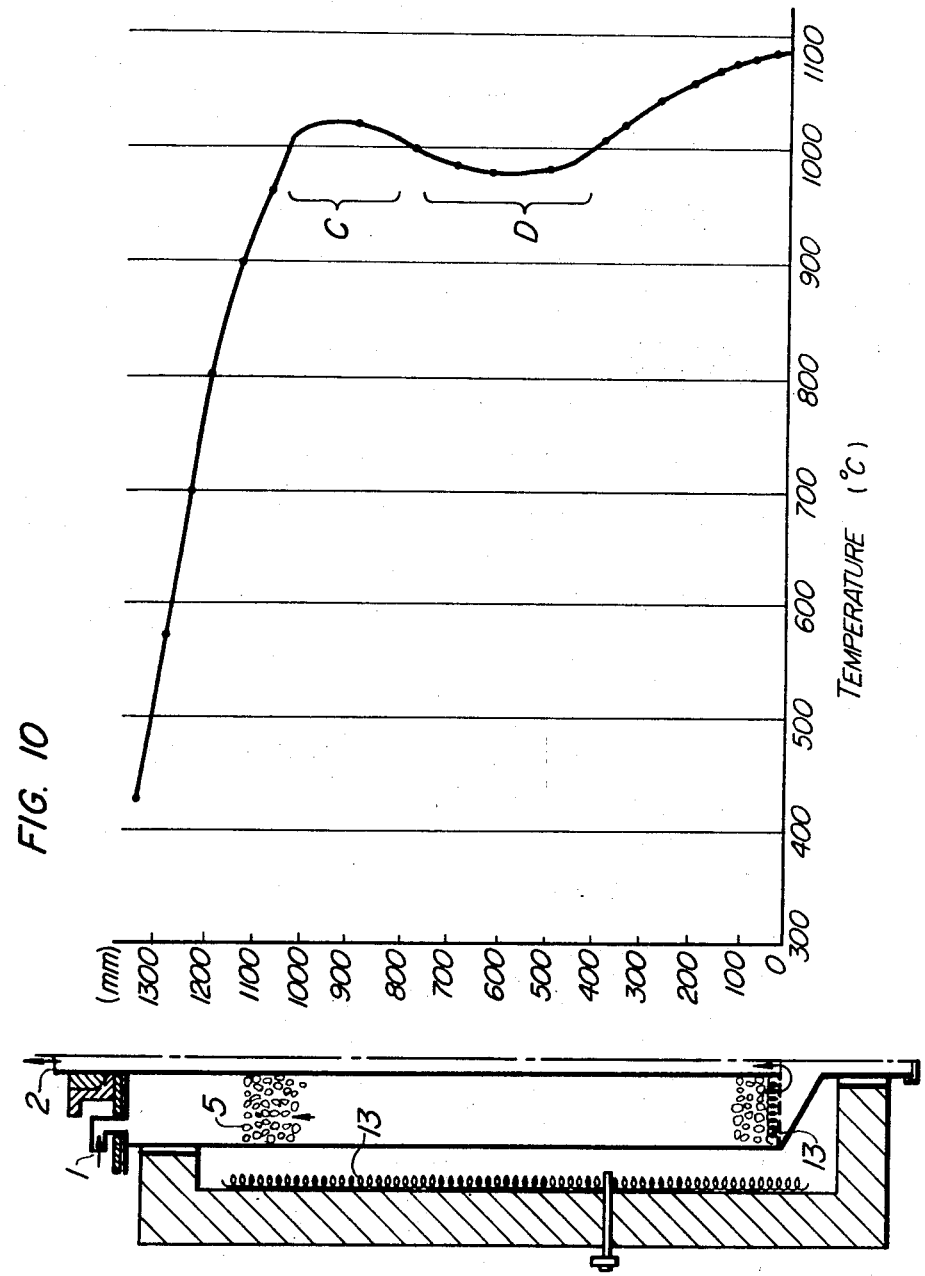
FIG. 10 is a diagram showing the temperature distribution during the reaction, using the reactor retort of FIG. 1.
Figure 11:
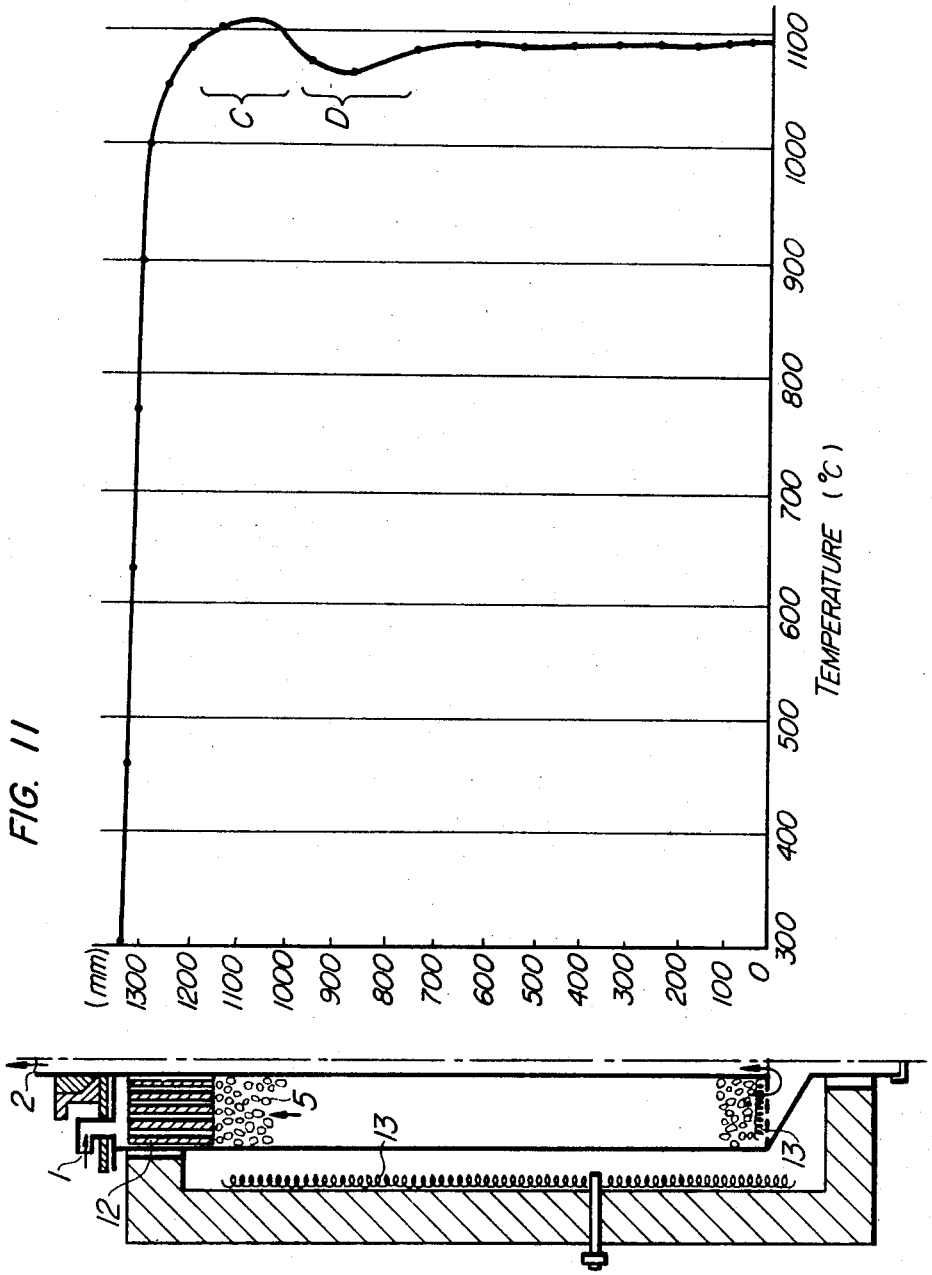
FIG. 11 is a diagram showing the temperature distribution during the reaction, when the present heat-insulating block is applied to the reactor retort of FIG. 1.

(2) Temperature distribution within the reactor retort before and after the provision of the heat-insulating block In FIG. 10, the temperature distribution inside the reactor retort during the reaction before the provision of the heat-insulating block in the reactor retort is shown. In FIG. 11, the temperature distribution after the provision of the heat-insulating block in the reactor retort is shown. The thermal decomposition conditions were equal for these two cases, but it is seen that the temperature distribution is considerably improved by the provision of the heat-insulating block. In these FIGS. 10 and 11, the zone C represents the exothermic reaction zone and the zone D represents the endothermic reaction zone.

(3) Generated gas compositions before and after the provision of the heat-insulating block (according to gas chromatography)

| | Before the provision of heat-insulating block | After the provision of heat-insulating block |
|---|---|---|
| Composition: | | |
| $H_2$ | 29.3% | 29.9%. |
| $CO_2$ | 0.21–0.25% | 0.16–0.18%. |
| $N_2$ | Balance | Balance. |
| CO | 23.3% | 23.5%. |
| $CH_4$ | 0.20–0.40% | 0.02–0.04%. |
| Dew point | −5° C. | −5° C. |

Remark: Deterioration of the reactor retort function with time was large before the provision of the heat-insulating block and thus the composition is shown by mean values of the entire generated gas.

As is clear from said gas chromatography that $CH_4$ content was decreased by providing the block in the reactor retort for the equal amount of gas thermal decomposition and equal dew point, and a relation between $CO_2$ and $H_2O$ contents approached to the theoretical relation of chemical equilibrium. These results seem to be greatly due to the improvement in the temperature distribution in the reactor retort. In view of the considerable decrease in $CH_4$ content, as well as said improvement in temperature distribution it seems that the catalysts filled in the reactor retort could maintain their catalytic activity without any contamination by soots.

Figure 3:
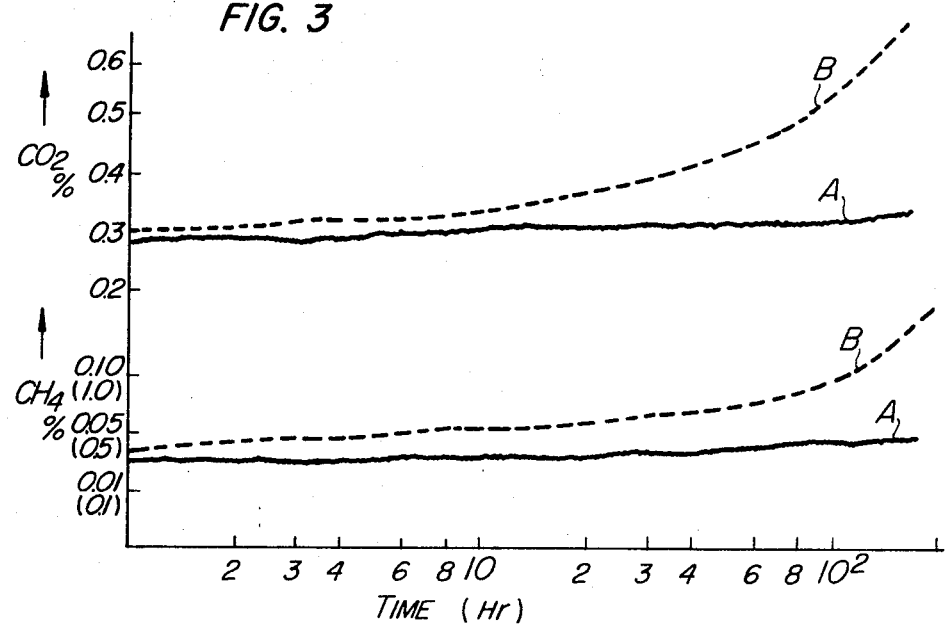
FIG. 3 is a comparative diagram showing changes in amounts of $CO_2$ and $CH_4$ in the generated gas with time.

(4) Change with time in generated gas composition before and after the provision of the heat-insulating block In FIG. 3, change in $CO_2$ and $CH_4$ contents with time in the generated gas when said butane gas was thermally decomposed in the conventional endothermic gas generator and that provided with the present heat-insulating block, is shown. In FIG. 3, the full line A represents the present invention and the broken line B the conventional generator. For the convenience of preparing the drawing, the scale of the $CH_4$ content according to the conventional generator is changed, as shown in figures in the parentheses. Change with time in $CH_4$ and $CO_2$ contents was considerably smaller when the heat-insulating block was provided in the reactor retort, than when no heat-insulating block was provided, and the generated gas having a very stable composition could be supplied. The stability of the gas composition obtained by the endothermic gas generator directly influences the quality of such treatment as gas carburizing, etc. where the generated gas is utilized. In fact, when the endothermic gas generator provided with the heat-insulating block was employed, operation could be continued for six months without any burn-out treatment for removing the soots by combustion.

(5) Lower limit temperature of the endothermic reaction zone in the catalyst layer Even if the thermal decomposition soots could be controlled in the exothermic reaction zone, considerable soots was accumulated in the endothermic reaction zone and successive catalyst layer, if the heat was insufficiently supplied to the endothermic reaction zone. At the same time, the generated gas composition was changed and the resistance of the catalyst layer was increased. As a result, the operation of the endothermic gas generator was obliged to discontinue.

Though the necessary amount of heat for the endothermic reaction zone depended upon the size of the reactor retort and the required amount of gas generation, the build-up of the soots could be prevented by keeping the portion in the catalyst layer which showed by lowest temperature (the center of the catalyst layer in the endothermic reaction zone) at 920° C. or higher.

In the present invention, the thermal decomposition of higher hydrocarbon gas to soots when passed through the exothermic reaction zone or heat radiation-receiving zone, which has been heretofore not taken into account, can be prevented by providing a heat-insulating block in the reactor retort. It seems that a chance to cover the catalyst surface with the soots formed before the feed gas reaches the catalyst layer is made considerably less by providing the heat-insulating block in the reactor retort.

The present invention is applicable to conversion of propane, town gas and methane, in addition to said butane. These gases have lower rates of thermal decomposition than that of butane, and thus in any case good results can be obtained. Furthermore, the present invention can be also effectively applied to gaseous higher hydrocarbon at the normal temperature or volatile liquid hydrocarbon.

The present invention is also applicable to the reactor retort of exothermic gas generator based on complete combustion or partial oxidation almost equal to the complete combustion of hydrocarbon gas and the build-up thermal decomposition soots can be effectively controlled.

What is claimed is:

1. A method of controlling the formation of soot when a hydrocarbon gas is thermally decomposed with air by partial oxidation in an endothermic gas generator having an oxidation catalyst layer, which comprises introducing a feed gas mixture of hydrocarbon and air rapidly and adiabatically into a catalyst layer, without any stagnation of gas flow, through an insulating means having a plurality of straight gas passages therethrough and sufficient thickness to attain insulation, and thermally decomposing the hydrocarbon gas in the catalyst layer while supplying the necessary heat to the catalyst layer from an outside heater source.

2. A method according to claim 1 wherein the straight gas passages are vertical.

3. A method according to claim 1, wherein the feed gas mixture is introduced into the catalyst layer at a gas velocity of 6–17 m./sec. through the gas passages and passed through the catalyst layer at a gas velocity of 3–10 m./sec.

4. A method according to claim 1, wherein the catalyst layer is kept at a temperature of about 920° C. to 1,100° C.

5. In an apparatus for the partial oxidation of hydrocarbon gas with air using an oxidation catalyst, comprising an endothemic gas generator having an oxidation catalyst layer, the improvement for controlling the formation of soot comprising a two member heat-insulating block placed upon the catalyst layer, the surface of the catalyst layer being in contact with the lower member of the block, without clearance therebetween, said heat-insulating block comprising heat-insulation brick as upper member and refractory brick as lower member, said two members being secured together thereby providing said block with an upper surface, a lower surface and an external side surface, said block having a plurality of straight gas passage perforations provided through the block communicating from the upper surface of the upper member to the lower surface of the lower member said block having a larger perforation at the center of the block communicating from the top surface to the bottom surface.

6. The apparatus of claim 5 wherein the gas passage perforations have expanded bottom openings.

7. The apparatus of claim 5 wherein the gas passage perforations are uniformly distributed in the block.

8. The apparatus of claim 5 wherein an annular groove is provided around the side surface for inserting an insulating packing.

9. The apparatus of claim 5 wherein the two members are tightly secured with bolts.

10. The apparatus of claim 5 wherein the gas passage perforations are vertical.

References Cited

UNITED STATES PATENTS

| | | | |
|---|---|---|---|
| 2,440,436 | 4/1948 | Creel | 23—288 |
| 2,951,749 | 9/1960 | Bartholome et al. | 48—196 |
| 2,990,237 | 6/1961 | Bowles et al. | 23—288 X |
| 3,467,504 | 9/1969 | Korwin | 48—196 X |
| 3,510,265 | 5/1970 | Kawahata | 23—288 X |

MORRIS O. WOLK, Primary Examiner

R. E. SERWIN, Assistant Examiner

U.S. Cl. X.R.

23—288 R, J; 48—196 R, 212